United States Patent
Pollack et al.

(10) Patent No.: US 8,679,430 B2
(45) Date of Patent: Mar. 25, 2014

(54) METHODS FOR REMOVAL OF MERCURY FROM FLUE GAS

(71) Applicant: Calgon Carbon Corporation, Pittsburgh, PA (US)

(72) Inventors: Nicholas R. Pollack, Moon, PA (US); Richard A. Hayden, Pittsburgh, PA (US)

(73) Assignee: Calgon Carbon Corporation, Pittsburgh, PA (US)

(*) Notice: Subject to any disclaimer, the term of this patent is extended or adjusted under 35 U.S.C. 154(b) by 0 days.

(21) Appl. No.: 13/650,431

(22) Filed: Oct. 12, 2012

(65) Prior Publication Data
US 2013/0039826 A1 Feb. 14, 2013

Related U.S. Application Data

(63) Continuation of application No. 13/082,337, filed on Apr. 7, 2011, now Pat. No. 8,309,046.

(60) Provisional application No. 61/321,696, filed on Apr. 7, 2010.

(51) Int. Cl.
*B01D 53/64* (2006.01)

(52) U.S. Cl.
USPC ............................................. 423/210

(58) Field of Classification Search
USPC ............................................. 423/210
See application file for complete search history.

(56) References Cited

U.S. PATENT DOCUMENTS

| | | | |
|---|---|---|---|
| 4,196,173 A * | 4/1980 | deJong et al. | 423/210 |
| 5,435,980 A * | 7/1995 | Felsvang et al. | 423/210 |
| 6,808,692 B2 | 10/2004 | Oehr | |
| 6,878,358 B2 | 4/2005 | Vosteen et al. | |
| 7,404,940 B2 | 7/2008 | Higgins et al. | |
| 7,435,286 B2 | 10/2008 | Olson et al. | |
| 7,514,052 B2 * | 4/2009 | Lissianski et al. | 423/210 |
| 8,168,147 B2 * | 5/2012 | Olson et al. | 423/210 |
| 8,309,046 B2 | 11/2012 | Pollack et al. | |
| 2004/0013589 A1 | 1/2004 | Vosteen et al. | |
| 2005/0147549 A1 * | 7/2005 | Lissianski et al. | 423/210 |
| 2006/0051270 A1 * | 3/2006 | Brunette | 423/210 |
| 2006/0204418 A1 * | 9/2006 | Chao et al. | 423/210 |
| 2007/0180990 A1 | 8/2007 | Downs et al. | |
| 2007/0234902 A1 | 10/2007 | Fair et al. | |
| 2009/0010828 A1 | 1/2009 | Holmes et al. | |
| 2009/0136401 A1 * | 5/2009 | Yang et al. | 423/210 |
| 2012/0100053 A1 | 4/2012 | Durham et al. | |
| 2012/0183458 A1 * | 7/2012 | Olson et al. | 423/210 |

FOREIGN PATENT DOCUMENTS

WO   WO 2011/127323 A2   10/2011

OTHER PUBLICATIONS

International Search Report and Written Opinion of the International Searching Authority, Dec. 28, 2011, from counterpart foreign application PCT/US2011/031638, International Filing Date Apr. 7, 2011.

* cited by examiner

*Primary Examiner* — Timothy Vanoy
(74) *Attorney, Agent, or Firm* — Pepper Hamilton LLP

(57) ABSTRACT

Methods and systems for reducing mercury emissions are provided herein. The methods, generally, include the steps of burning a heavy metal containing fuel source and introducing sorbent materials and introducing one or more halogen compounds into the combustion chamber and/or exhaust stream to remove the heavy metal.

16 Claims, 2 Drawing Sheets

METHODS FOR REMOVAL OF MERCURY FROM FLUE GAS

CROSS-REFERENCE TO RELATED APPLICATIONS

This application is a continuation of U.S. application Ser. No. 13/082,337 entitled "Methods for Removal of Mercury from Flue Gas," filed Apr. 7, 2011, issued Nov. 13, 2012 as U.S. Pat. No. 8,309,046, which claims benefit of priority to U.S. Provisional Patent Application No. 61/321,696 filed on Apr. 10, 2010 entitled "Methods for Removal of Mercury from Flue Gas," the entire contents of which are hereby incorporated by reference in their entireties.

GOVERNMENT INTERESTS

Not applicable

PARTIES TO A JOINT RESEARCH AGREEMENT

Not applicable

INCORPORATION BY REFERENCE OF MATERIAL SUBMITTED ON A COMPACT DISC

Not applicable

BACKGROUND

Not applicable

SUMMARY OF THE INVENTION

Various embodiments include a method for reducing heavy metal emissions including the steps of burning a heavy metal containing fuel in a combustion chamber, introducing molecular halogen or one or more halogen precursors into the combustion chamber or an exhaust stream resulting from combustion of the heavy metal containing fuel near the combustion chamber, and injecting activated carbon having a mean particle diameter of less than 15 μm into the exhaust stream. In some embodiments, the one or more halogen precursors may be calcium hypochlorite, calcium hypobromite, calcium hypoiodite, calcium chloride, calcium bromide, calcium iodide, magnesium chloride, magnesium bromide, magnesium iodide, sodium chloride, sodium bromide, sodium iodide, ammonium chloride, ammonium bromide, ammonium iodide, potassium tri-chloride, potassium tri-bromide, and potassium tri-iodide. In other embodiments, the halogen precursors can be calcium bromide, and in still other embodiments, the one or more halogen precursors may be a solid or powder, in an aqueous solution, or gaseous halogen. In certain embodiments, the molecular halogen or one or more halogen precursors can be introduced into the combustion chamber or an exhaust stream resulting from combustion of the heavy metal containing fuel near at a concentration and/or rate of addition sufficient to result in a concentration of halogen to produce a halogen to adsorptive material ratio of at least 0.7 moles of halogen per pound of adsorbent material, or about 0.7 moles/lb to about 5.7 moles/lb or about 0.8 moles/lb to about 3.1 moles/lb halogen to adsorbent material. In some embodiments, an aqueous solution of a halogen precursor having a concentration of about 50% by weight can be introduced into the combustion chamber or an exhaust stream resulting from combustion of the heavy metal containing fuel near the combustion chamber at a rate of less than 10 gallons per hour. In other embodiments, the halogen precursor may be introduced with the fuel source, injected into the combustion chamber, injected into the exhaust stream near the combustion chamber, or combinations thereof. In some embodiments, the activated carbon has a mean particle diameter of from about 2 μm to 10 μm. In other embodiments, the sorbent material can be injected into the exhaust stream at a rate of less than 5 pounds per million actual cubic feet (lbs/MMacf), less than about 4 lbs/MMacf, less than about 3 lbs/MMacf, or less than about 1 lbs/MMacf based on the total exhaust stream flow, and in particular embodiments, the sorbent material may be injected into the exhaust stream at a rate of less than 100 lbs/hr. In certain embodiments, the sorbent materials injected upstream of an air pre-heater (APH), and in particular embodiments, about 90% of the mercury in the fuel source may be removed. In some embodiments, the fuel source can be coal.

DESCRIPTION OF DRAWINGS

For a fuller understanding of the nature and advantages of the present invention, reference should be made to the following detailed description taken in connection with the accompanying drawings, in which.

DETAILED DESCRIPTION

Figure 1:
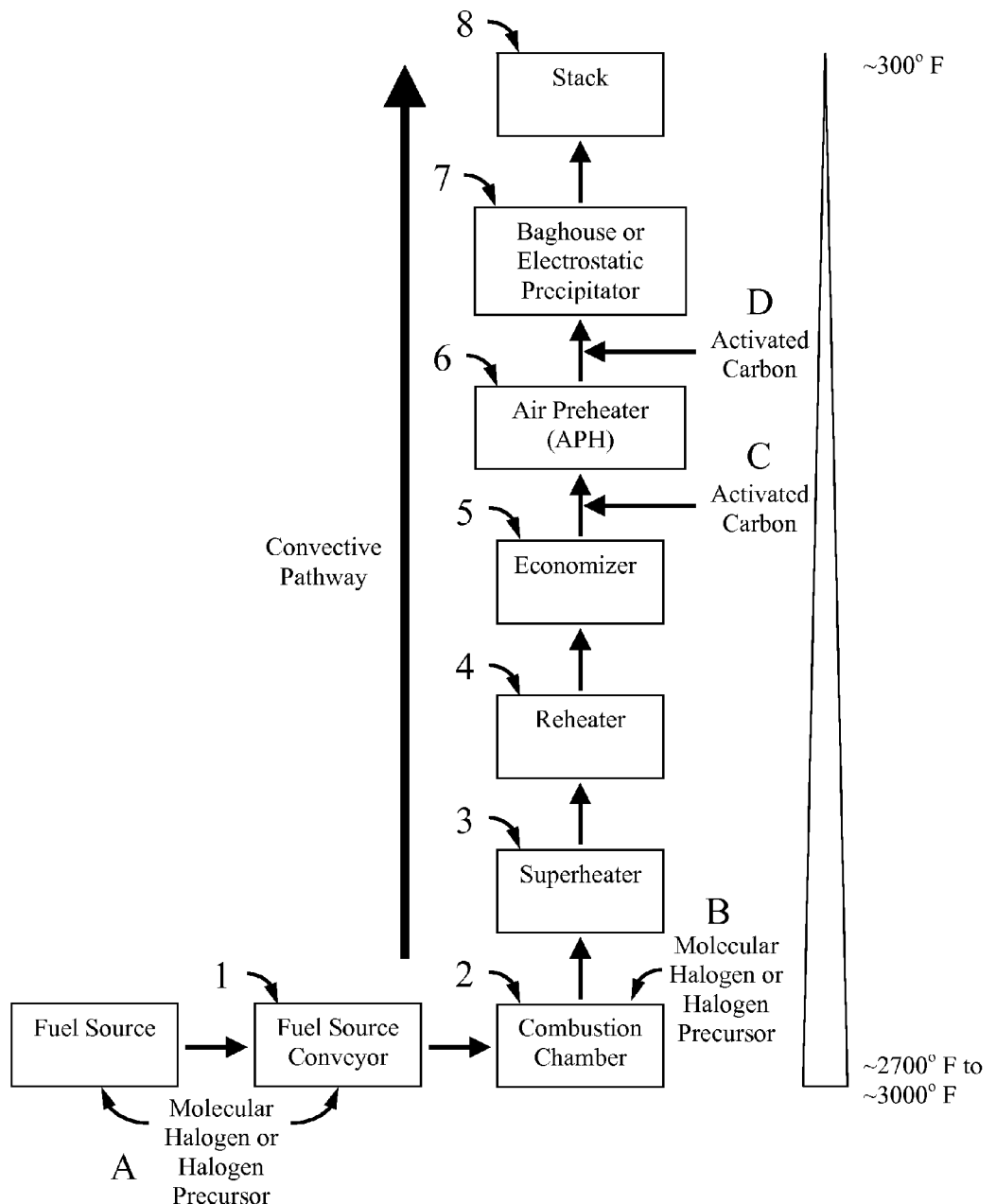
FIG. 1 shows a flow chart showing elements of an exemplary coal fired power plant.

Before the present compositions and methods are described, it is to be understood that this invention is not limited to the particular processes, compositions, or methodologies described, as these may vary. It is also to be understood that the terminology used in the description is for the purpose of describing the particular versions or embodiments only, and is not intended to limit the scope of the present invention, which will be limited only by the appended claims. Unless defined otherwise, all technical and scientific terms used herein have the same meaning as commonly understood by one of ordinary skill in the art. Although any methods and materials similar or equivalent to those described herein can be used in the practice or testing of embodiments of the present invention, the preferred methods, devices, and materials are now described. All publications mentioned herein are incorporated by reference in their entirety. Nothing herein is to be construed as an admission that the invention is not entitled to antedate such disclosure by virtue of prior invention.

It must also be noted that as used herein and in the appended claims, the singular forms "a," "an," and "the" include plural reference unless the context clearly dictates otherwise. Thus, for example, reference to "a combustion chamber" is a reference to "one or more combustion chambers" and equivalents thereof known to those skilled in the art, and so forth.

As used herein, the term "about" means plus or minus 10% of the numerical value of the number with which it is being used. Therefore, about 50% means in the range of 45%-55%.

As used herein, the term "sorbent material" is meant to encompass all know materials from any source capable of adsorbing mercury. For example, sorbent materials include, but are not limited to, activated carbon, natural and synthetic zeolite, silica, silica gel, alumina, and diatomaceous earths.

Mercury is a known environmental hazard and leads to health problems for both humans and non-human animal species. Approximately 50 tons per year are released into the atmosphere in the United States, and a significant fraction of the release comes from emissions from coal burning facilities such as electric utilities. To safeguard the health of the public and to protect the environment, the utility industry is continuing to develop, test, and implement systems to reduce the level of mercury emissions from its plants. In the combustion of carbonaceous materials, it is desirable to have a process wherein mercury and other undesirable compounds are captured and retained after the combustion phase so that they are not released into the atmosphere.

One of the most promising solutions for mercury removal from flue gas is Activated Carbon Injection (ACI). Activated carbon is a highly porous, non-toxic, readily available material that has a high affinity for mercury vapor. This technology is already established for use with municipal incinerators. Although the ACI technology is effective for mercury removal, the short contact time between the activated carbon and the flue gas stream results in an inefficient use of the full adsorption capacity of the activated carbon.

Various embodiments of the invention are directed to methods for removing heavy metals such as, for example, mercury, from a fluid stream produced as a result of combustion of a heavy metal containing fuel source by applying a molecular halogen or halogen precursor to the fuel source or introducing a molecular halogen or halogen precursor into a combustion chamber during combustion of the fuel source or introducing a molecular halogen or halogen precursor into an exhaust stream resulting from the combustion of the fuel source near the combustion chamber and injecting sorbent material into the exhaust stream, i.e. flue gas, resulting from consumption of the fuel source. In such embodiments, the combination of applying the molecular halogen or halogen precursor to the fuel source or injecting the molecular halogen or halogen precursor into the combustion chamber and injection of sorbent material into the exhaust stream may result in substantial reduction in heavy metal emissions from the exhaust stream while significantly reducing the amount of both the molecular halogen or halogen precursor and the sorbent material used in such methods. In particular embodiments, mercury removal is improved over conventional methods. In some embodiments, greater than about 80% or greater than about 90% of the heavy metal can be removed from the exhaust stream based on the heavy metal content of the fuel source. Thus, the combination achieves similar or improved removal rates while reducing consumption of the molecular halogen or halogen precursor and sorbent material thereby reducing costs.

The methods and systems described above may implemented into any conventional system that involves combustion of a fuel source that includes heavy metals. Numerous systems and facilities that burn heavy metal-containing fuels are known and used in the art. For example, some embodiments provide compositions, methods, and systems for reducing emissions of heavy metals from incinerators, including solid waste incinerators. Other embodiments provide compositions, methods, and systems for reducing emissions of heavy metals such as mercury that arise from the combustion of heavy metal containing fossil fuels at, for example, power plants.

FIG. 1 provides a flow chart depicting relevant portions of an exemplary coal fired power plant. As indicated in FIG. 1, some such facilities may include a feeding mechanism such as a conveyor 1 for delivering fuel such as coal into a furnace or combustion chamber 2 where the fuel source is burned. The fuel fed into the furnace is burned in the presence of oxygen with typical flame temperatures in the combustion chamber of the furnace from about 2700° F. to about 3000° F. as indicated to the right of the flow chart. In operation, the fuel may be fed into the furnace at a rate suitable to achieve the output desired from the furnace the heat from which can be used to boil water for steam or provide direct heat that can be used to turn turbines that are eventually used to produce electricity (not pictured). From the furnace or combustion chamber 2, ash, combustion gases, and air move downstream, away from the fireball, into a convective pathway, or exhaust stream, (large arrow to the left of the diagram) that can include various zones of decreasing temperature as indicated to the right. From the combustion chamber, the heated ash, combustion gases, and air can move through a superheater 3 and, in cases, a reheater 4 where, for example, water is heated to provide steam which will eventually power a turbine that is used to generate electricity. The ash, combustion gases, and air can also pass through, for example, an economizer 5 where water fed into the superheater 3 and/or reheater 4 is preheated, and an air preheater 6 where air that is fed into the combustion chamber 2 is preheated. The combustion gases and ash may eventually pass through a baghouse or electrostatic precipitator 7 where particulate matter is collected. By this time, the temperature of the ash, combustion gases, and air is reduced to about 300° F. before being emitted from the stack 8 and released into the atmosphere.

In some embodiments, the halogen source may be introduced during combustion by injecting molecular halogen or a halogen precursor B into the combustion chamber 2 or by applying the halogen source directly to the fuel source prior to combustion A. In other embodiments, the halogen may be found in the fuel source. For example, waste that includes plastics or rubbers may include halogen containing components that may release halogen ions or molecular halogens during incineration. In various embodiments, sorbent material may be injected into the exhaust stream anywhere along the convection pathway before emission of the ash, combustion gases, and air into the atmosphere, and in particular embodiments, sorbent material may be injected upstream of the baghouse or electrostatic precipitator 7. In certain embodiments, sorbent material may be injected upstream C of the air preheater (APH) 6, and in some embodiments, sorbent material may be injected into the exhaust stream downstream D of the APH 6. In still other embodiments, sorbent material may be injected both upstream C of the APH 6 and downstream D of the APH 6.

The molecular halogen or halogen precursor of various embodiments may be obtained from any source. For example, in some embodiments, molecular sources such as chlorine gas, bromine gas, or iodine gas can be injected into the exhaust stream near the combustion chamber alone or in combination with halogen precursor. In other embodiments, one or more halogen precursors may be applied to the fuel source, introduced into the combustion chamber, injected into the exhaust stream near the combustion chamber, or a combination thereof.

Numerous halogen precursors (halogen precursors) are known in the art and may be used in embodiments of the invention. In some embodiments, the halogen precursor may be a gaseous precursor such as, for example, hydrogen chloride, hydrogen bromide, or molecular chloride or bromide. The halogen precursor may be an organic or inorganic halogen-containing compound. For example, in some embodiments, the halogen precursor may be one or more inorganic halogen salts, which for bromine may include bromides, bromates, and hypobromites, for iodine may include iodides, iodates, and hypoiodites, and for chlorine may be chlorides, chlorates, and hypochlorites. In certain embodiments, the inorganic halogen salt may be an alkali metal or an alkaline earth element containing halogen salt where the inorganic halogen salt is associated with an alkali metal such as lithium, sodium, and potassium or alkaline earth metal such as beryllium, magnesium, and calcium counterion. Non-limiting examples of inorganic halogen salts including alkali metal and alkali earth metal counterions include calcium hypochlorite, calcium hypobromite, calcium hypoiodite, calcium chloride, calcium bromide, calcium iodide, magnesium chloride, magnesium bromide, magnesium iodide, sodium chloride, sodium bromide, sodium iodide, ammonium chloride, ammonium bromide, ammonium iodide, potassium tri-chloride, potassium tri-bromide, potassium tri-iodide, and the like. In other embodiments, the halogen may from an organic source, which contains a suitably high level of the halogen. Organic halogen precursors include, for example, methylene chloride, methylene bromide, methylene iodide, ethyl chloride, ethyl bromide, ethyl iodide, chloroform, bromoform, iodoform, carbonate tetrachloride, carbonate tetrabromide, carbonate tetraiodide, and the like.

In some embodiments, the halogen precursor may include one or more additional elements such as, for example, a calcium source, a magnesium source, a nitrate source, a nitrite source, or a combination thereof. Exemplary calcium and magnesium sources are well known in the art and may be useful to aid in the removal of sulfur in the flue gas that is released from the fuel source during combustion. In such embodiments, the calcium or magnesium source may include inorganic calcium such as, for example, calcium oxides, calcium hydroxides, calcium carbonate, calcium bicarbonate, calcium sulfate, calcium bisulfate, calcium nitrate, calcium nitrite, calcium acetate, calcium citrate, calcium phosphate, calcium hydrogen phosphate, and calcium minerals such as apatite and the like, or organic calcium compounds such as, for example, calcium salts of carboxylic acids or calcium alkoxylates or inorganic magnesium such as, for example, magnesium oxides, magnesium hydroxides, magnesium carbonate, magnesium bicarbonate, magnesium sulfate, magnesium bisulfate, magnesium nitrate, magnesium nitrite, magnesium acetate, magnesium citrate, magnesium phosphate, magnesium hydrogen phosphate, and magnesium minerals and the like, or organic magnesium compounds such as, for example, magnesium salts of carboxylic acids or magnesium alkoxylates. In certain embodiments, the calcium or magnesium source may be associated with the halide precursor such as, for example, calcium bromide, magnesium bromide, calcium chloride, magnesium chloride, calcium iodide, magnesium iodide, and the like. Nitrate and nitrite sources are also well known in the art and any source of nitrate of nitrite can be formulated with halogen precursor.

The halogen precursor may be a solid such as a powder, a liquid, or a gas. For example, in some embodiments, the halogen precursor may be an aqueous solution that can be sprayed onto the fuel source such as coal before combustion or can be injected into the combustion chamber or exhaust stream near the combustion chamber. A liquid halogen precursor composition may be prepared at any suitable concentration. For example, in some embodiments, an aqueous solution of a halogen precursor such as, for example, calcium bromide or calcium chloride, may have a concentration of up to about 75%, and in other embodiments, the halogen precursor concentration in the aqueous solution may be up to about 60% by weight, 55% by weight, 50% by weight, 45% by weight, or 40% by weight or any concentration between these values. In still other embodiments, an aqueous solution of a halogen precursor may include about 10% to about 75% by weight, about 20% to about 60% by weight, about 30% to about 55% by weight, or about 40% to about 55% by weight of the halogen precursor. Similarly, in other embodiments, dry, powdered halogen precursor may be applied to the coal at a concentration necessary to achieve a similar concentration of halogen in the flue gas stream.

In various embodiments, the molecular halogen or halogen precursor, which may be in solid, such as a powder, liquid, or a gaseous form, may be continuously supplied to the combustion chamber or provided incrementally during combustion. The rate of addition of the molecular halogen and halogen precursor may vary among embodiments and may depend, for example, on the rate of combustion of the fuel source, the origin of the fuel source, the amount of mercury in the fuel source, the adsorption of mercury, and the like. For example, in some embodiments, an about 40% to about 55% by weight aqueous solution of a halogen precursor such as, for example, calcium bromide or calcium chloride, may be introduced into a combustion chamber or injected into an exhaust stream near the combustion chamber at a rate of about 500 gallons/hr or less, and in other embodiments, an about 40% to about 55% by weight aqueous solution of the halogen precursor introduced into a combustion chamber or injected into an exhaust stream near the combustion chamber at a rate of about 400 gallons/hr or less, 300 gallons/hr or less, 200 gallons/hr or less, or 100 gallons/hr or less. In certain embodiments, an about 40% to about 55% by weight aqueous solution of the halogen precursor introduced into a combustion chamber or injected into an exhaust stream near the combustion chamber at a rate of less than 50 gallons/hr or less than 25 gallons/hr or less than 20 gallons/hr.

The feed rate of the molecular halogen or halogen precursor may vary among embodiments and may vary depending on, for example, the feed rate of the fuel source and/or the rate of consumption of the fuel source. For example, a combustion chamber burning about 330 tons/hr of a fuel source such as coal in six mills each burning about 55 tons/hr where about 10 gal/hr of a 50% by weight aqueous solution of calcium bromide ($CaBr_2$) is introduced into the combustion chamber during burning can result in about 125 ppm bromine added to the coal based on dry weight. Thus, in various embodiments, the concentration and/or feed rate the molecular halogen or halogen precursor may be modified based on the rate of consumption of the fuel source such that up to about 400 ppm (dry basis), up to about 500 ppm (dry basis) or up to about 700 ppm (dry basis) bromine may be added the fuel source. In some embodiments, about 50 ppm to about 500 ppm (dry basis), about 75 ppm to about 400 ppm (dry basis), about 100 ppm to about 300 ppm (dry basis), or about 125 ppm to about 200 ppm (dry basis) of bromine may be added to the fuel source.

In some embodiments, the methods and systems described herein may be utilized in a multi-stage furnace having for example, a primary and secondary combustion chambers, a rotary kiln, afterburning chambers, and any combinations thereof. In such embodiments, molecular halogen or halogen precursor in a solid or liquid form may be introduced into any one or any combination of the chambers of the furnace. For example, in some embodiments, the molecular halogen or halogen precursor may be introduced into one combustion chamber, and in other embodiments, the molecular halogen or halogen precursor may be introduced into a combination of combustion chambers. In still other embodiments, molecular halogen or halogen precursor may be introduced into one or more combustion chambers and into an exhaust stream after combustion.

In certain embodiments, the halogen precursor may be introduced into one or more combustion chambers and/or exhaust stream as an aqueous solution that is sprayed or injected into the chamber or exhaust stream. For example, in some embodiments, an aqueous solution of a halogen precursor may be sprayed or injected into a combustion gas stream downstream of a waste-heat boiler. In still other embodiments, an aqueous solution of the halogen precursor may be introduced into a recirculated substream such as, for example, a recirculated flue gas, recirculated ash, or recirculated fly ash. While embodiments are not limited by the zone where the molecular halogen or halogen precursor is introduced into the exhaust gas stream, the temperature in the injection zone should be sufficiently high to allow dissociation and/or oxidation of the elemental halogen from the halogen precursor. For example, the temperature at the injection zone may be greater than about 1000° F., and in some embodiments, greater than about 1500° F.

Without wishing to be bound by theory, halogens from the molecular halogen or halogen precursor can oxidize with heavy metals released from the fuel source when it is burned in the combustion chamber. In general, oxidized heavy metals, such as mercuric halide species are adsorbable by alkaline solids in the exhaust stream such as fly ash, alkali fused acidic ash (e.g., bituminous ash), dry flue gas desulfurization solids such as calcium oxide, calcium hydroxide or calcium carbonate, and removed from the flue gas by commonly used heavy metal control systems such as, for example, electrostatic precipitators, wet flue gas desulphurization systems, fabric filters, and baghouses. In certain embodiments, oxidized heavy metals may be adsorbed by activated carbon. Without wishing to be bound by theory, the rate at which a solution of a halogen precursor may be significantly reduced by combining the application of a halogen-containing composition with injection of sorbent material into the fluid stream of the combustion gases even when the mercury content of the fuel source is relatively high.

Activated carbon may be used in any embodiment. In such embodiments, the activated carbon may be obtained from any source and can be made from a variety of starting materials. For example, suitable materials for production of activated carbon include, but are not limited to, coals of various ranks such as anthracite, semianthracite, bituminous, subbituminous, brown coals, or lignites; nutshells, such as coconut shell; wood; vegetables such as rice hull or straw; residues or by-products from petroleum processing; and natural or synthetic polymeric materials. The carbonaceous material may be processed into carbon adsorbents by any conventional thermal or chemical method known in the art. The adsorbents will inherently impart different surface areas and pore volumes. Generally, for example, lignites can result in carbon having surface areas about 500-600 $m^2/g$ and, typical fiber-based carbons areas are about 1200-1400 $m^2/g$. Certain wood-based carbons may have areas in the range of about 200 $m^2/g$, but tend to have a very large pore volume.

Surface area and pore volume of coal based carbon may also be made to allow for some control of surface area and pore volumes and pore size distributions. In some embodiments, the activated carbon adsorbent may have large surface area as measured by the Brunauer-Emmett-Teller ("BET") method, and may have a substantial micropore volume. As used herein, "micropore volume" is the total volume of pores having diameter less than about 2 nm. In some embodiments, suitable carbon adsorbents may have a BET surface areas greater than about 10 $m^2/g$ or about 50 $m^2/g$, greater than about 200 $m^2/g$, or greater than about 400 $m^2/g$. In other embodiments, the carbon adsorbent may have a micropore volume of greater than about 5 $cm^3/100$ g, and in still other embodiments, the adsorbent may have a micropore volume greater than about 20 $cm^3/100$ g.

Sorbent materials, such as activated carbon, of various sizes have been used to capture heavy metals in systems currently utilized, and any size sorbent material can be used in various embodiments. For example, in some embodiments, the sorbent material may have a mean particle diameter (MPD) of about 0.1 µm to about 100 µm, and in other embodiments, the MPD may be about 1 µm to about 30 µm. In still other embodiments, the MPD of the sorbent material may be less than about 15 µm, and in some particular embodiments, the MPD may be about 2 µm to about 10 µm, about 4 µm to about 8 µm, or about 5 µm or about 6 µm.

In some embodiments, the sorbent material may be treated with, for example, a halogen containing salt. For example, in various embodiments, the sorbent material may be impregnated with a bromine by, for example, immersing the sorbent material in a solution of a hydrogen bromide or a stream of elemental bromine gas for sufficient time to allow the bromine to impregnate the sorbent material. Various methods for impregnating the sorbent material and types of impregnated sorbent material are known and used in the art, and any such sorbent material may be used in embodiments.

The sorbent material may be injected into the exhaust stream anywhere along the convection pathway downstream of the combustion chamber and before the exhaust is emitted from the stack. The sorbent material of various embodiments may generally be injected downstream of a heavy metal control systems such as, for example, electrostatic precipitators, wet flue gas desulphurization systems, fabric filters, and baghouses or other ash or fly ash collection means where particulate matter can be collected and upstream of the combustion chamber. In certain embodiments, the sorbent material may be injected at any zone in the convection pathway having a temperature of less than about 700° F., less than about 500° F., less than about 400° F. or less than about 350° F. For example, in some embodiments, sorbent material may be injected into an exhaust stream either upstream or downstream of an air pre-heater (APH), and in other embodiments, the sorbent material may be injected upstream of an air pre-heater (APH).

In some embodiments, the rate of injection of the sorbent material may depend upon the flow rate of the exhaust stream. For example, in a plant having a exhaust (flue) gas flow rate of about 2,000,000 actual cubic feet per minute (acfm) in which about 100 lbs/hr of sorbent material is injected into exhaust stream in the ductwork of the plant, the rate of addition of sorbent material is about 0.8 pounds per million actual cubic feet (lbs/MMacf). Therefore, in various embodiments, the injection rate of the sorbent material may vary depending up on the flow rate of the exhaust gas in the ductwork. In such embodiments, the rate of addition of sorbent material based on the flow rate of the exhaust gas may be up to about 4 lbs/MMacf or up to about 5 lbs/MMacf. In other embodiments, the rate of addition of the sorbent material based on the flow rate of the exhaust gas may be from about 0.25 lbs/MMacf to about 5 lbs/MMacf, about 0.5 lbs/MMacf to about 4.0 lbs/MMacf, or about 0.75 lbs/MMacf to about 3.0 lbs/MMacf, and in particular embodiments, the rate of addition may be about 0.75 lbs/MMacf to about 1.5 lbs/MMacf.

Particular embodiments, for exemplary purposes, include methods and systems including the introduction of a halogen precursor, such as, calcium bromide, calcium chloride, sodium bromide, or sodium chloride, into a combustion chamber where a heavy metal containing fuel source is being burned, and injection of sorbent material having an MPD of less than about 15 µm into an exhaust stream upstream of a heavy metal and/or particulate control systems such as, for example, electrostatic precipitators, wet flue gas desulphurization systems, fabric filters, and baghouses or other ash or fly ash collection means where particulate matter can be collected. In some such embodiments, less than about 10 gallons/hour of the an aqueous halogen precursor may be introduced into the combustion chamber, and less than about 100 lbs/hour of sorbent material may be injected into the exhaust stream. As a result of such treatment, mercury emission from the plant employing such methods and systems may be reduced by greater than about 80% and in some embodiments, greater than 90%.

Further embodiments, include methods for reducing mercury emissions from flue gas in which the ratio of halogen to sorbent material provided is from about 0.7 to about 4.6 moles of halogen per pound of activated carbon, and in some embodiments, from about 0.8 to about 3.1 or about 1.2 to about 2.0 moles of halogen per pound of activated carbon. In such embodiments, the sorbent material may have an MPD of less than about 15 μm and, in certain embodiments, the sorbent material may have an MPD of less than about 10 μm. In still other embodiments, the sorbent material may have an MPD of about 6 μm or less. The halogen and sorbent material may be provided anywhere during the process. For example, in some embodiments, the halogen may be applied to the fuel source before combustion, and in other embodiments, the halogen may be introduced into the combustion chamber while the fuel is burned. In still other embodiments, the halogen may be introduced into the flue gas stream either before or after the sorbent material. In further embodiments, the halogen may be provided with the activated carbon. For example, in some embodiments, the halogen may be injected into the flue gas stream separately with the activated carbon, and in other embodiments, the halogen may be applied to the sorbent material before it is introduced into the flue gas stream.

In embodiments in which the halogen is applied to the sorbent material before being injected into the flue gas stream, the ratio of halogen to sorbent material may be the same as the ratio of halogen to sorbent material when sorbent material is introduced separately. For example, in some exemplary embodiments, a halogen salt such as any of the halogen salts described above may be applied to an adsorbent material having an MPD of less than 15 μm, less than 12 μm, less than 10 μm in a ratio of from about 0.14 to about 1.0 pounds of halogen salt per pound of sorbent material to provide a composition that is from about 12 wt. % to about 50 wt. % halogen salt or about 15 wt. % to about 40 wt. % halogen salt. In another exemplary embodiment, a halogen salt such as calcium bromide ($CaBr_2$) or ammonium bromide ($NH_4Br$) may be applied to sorbent material having an MPD of about 6 μm at a ratio of about 0.43 pounds of halogen salt per pound of sorbent material or about 30 wt. % halogen salt, and the sorbent material/halogen salt combination may be introduced into the flue gas stream. These ratios can also be expressed as moles of halogen per pound of adsorbent material. For example, in some embodiments, the ratio of moles of halogen per pound of sorbent material may be from about 0.7 moles/lb to about 5.7 moles/lb, 0.8 moles/lb to about 3.1 moles/pound or any ratio there between, and in particular embodiments, the ratio of halogen per pound of sorbent material can be 2.0 moles/lb. In such embodiments, the halogen salt may be applied by conventional impregnation process or the halogen salt may be applied by mixing dry sorbent material with dry halogen salt. In other embodiments, the sorbent material can be impregnated using a gaseous halogen. In certain embodiments, such as those described above, the sorbent material may be activated carbon.

Coal fired power plants utilizing conventional methods for reducing mercury emissions where a halogen precursor is introduced into a combustion chamber and no sorbent material is injected into the exhaust generally inject halogen precursor at a rate of greater than 20 gallons/hour to reduce the mercury emission sufficiently. Coal fired power plants that utilize sorbent material injection without introducing a halogen precursor during combustion can inject greater than about 250 lbs/hour of sorbent material into the exhaust stream to effectively reduce mercury emissions. In contrast, some embodiments of the invention provide mercury reduction of greater than about 80% or greater than 90% while using less than about 10 gallons/hour of a halogen precursor and less than 100 lbs/hour of an activated carbon, and in particular embodiments, less than 100 lbs/hour of sorbent material having a MPD of less than about 15 μm. This is a dramatic and surprising reduction in the amount of consumables necessary to effectively reduce mercury emissions to below regulatory levels. Such embodiments, therefore, provide substantial economic advantages over currently used methods for reducing mercury emission, while simultaneously reducing the amount of ash produced by plants that employ sorbent material injection and the amount of halogen precursor consumed.

In some embodiments, mercury levels can be monitored with conventional analytical equipment using industry standard detection and determination methods, and in such embodiments, monitoring can be conducted periodically, either manually or automatically. For example, mercury emissions can be monitored once an hour to ensure compliance with government regulations and to adjust the rate of halogen precursor introduction into the combustion chamber, the rate of sorbent material injection, or both. Mercury can be monitored in the convective stream at suitable locations. For example, in some embodiments, mercury released into the atmosphere can be monitored and measured on the clean side of a particulate control system.

EXAMPLES

Although the present invention has been described in considerable detail with reference to certain preferred embodiments thereof, other versions are possible. Therefore the spirit and scope of the appended claims should not be limited to the description and the preferred versions contained within this specification. Various aspects of the present invention will be illustrated with reference to the following non-limiting examples.

Example 1

A coal-fired power plant fitted with a system to add calcium bromide onto the coal prior to the combustion chamber and lances for injecting activated carbon into the ductwork of the power plant at various locations was utilized for testing. Coal burned at this facility was periodically tested for mercury content to ensure accuracy of mercury removal testing. Various powdered activated carbons (PACs) tested at this facility are provided in Table 1.

TABLE 1

| Powdered Activated Carbon (PAC) | | |
|---|---|---|
| Identifier | Particle Size (MPD) | Brominated |
| Std | 16 μm | No |
| Std Br | 16 μm | Yes |
| PAC 6 | 6 μm | No |
| PAC 30 | 30 μm | No |

Each of the PACs described in Table 1 was injected into the exhaust stream of the plant down stream of the APH at rate of about 100 lbs/hr or about 200 lbs/hr either with or without calcium bromide ($CaBr_2$) injection into the combustion chamber. The results are provided in Table 2 and are illustrated in FIG. 2.

TABLE 2

Injection Rate Raw Data

Figure 2:
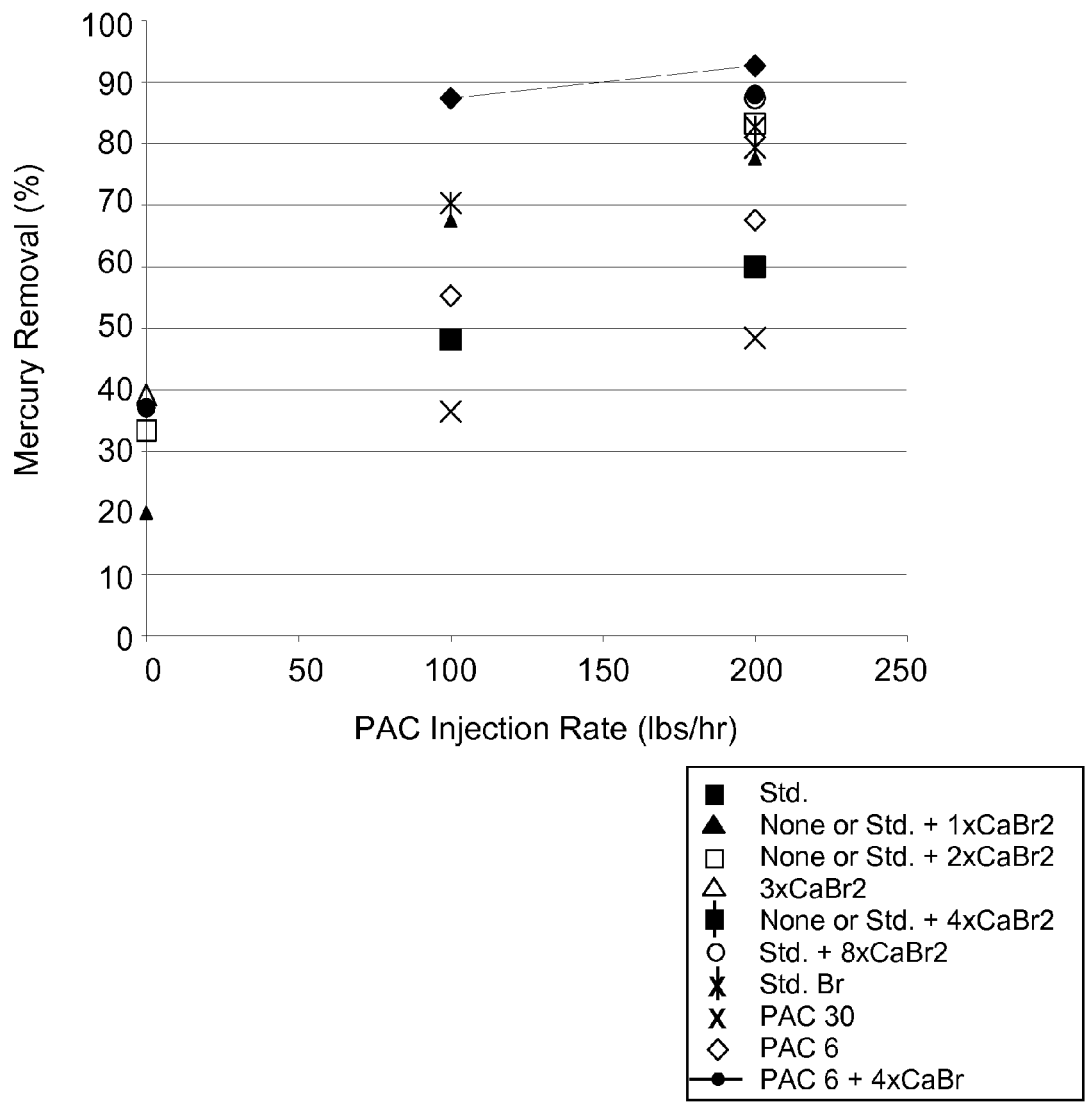
FIG. 2 shows a chart comparing the percent removal of mercury versus the injection rate for activated carbon.

| Symbol FIG. 2 | Particle | CaBr | PAC Injection Rate (lbs/hr) | Removal (%) |
|---|---|---|---|---|
| ■ | Std. | 0 | 100 | 48.2 |
|   | Std. | 0 | 200 | 60.0 |
| ▲ | None | 1X | 0 | 20.0 |
|   | Std. | 1X | 100 | 67.5 |
|   | Std. | 1X | 200 | 77.6 |
| □ | None | 2X | 0 | 33.4 |
|   | Std. | 2X | 200 | 83.3 |
| Δ | None | 3X | 0 | 39.2 |
| ● | None | 4X | 0 | 37.1 |
|   | Std. | 4X | 200 | 88.0 |
| ○ | Std. | 8X | 200 | 87.4 |
| * | Std. Br | 0 | 100 | 70.4 |
|   | Std. Br | 0 | 200 | 82.7 |
|   | Std. Br | 0 | 200 | 79.4 |
| X | PAC 30 | 0 | 100 | 36.5 |
|   | PAC 30 | 0 | 200 | 48.4 |
| ◊ | PAC 6 | 0 | 100 | 55.3 |
|   | PAC 6 | 0 | 200 | 67.6 |
| ♦ | PAC 6 | 4X | 100 | 87.4 |
|   | PAC 6 | 4X | 200 | 92.7 |

As indicated in FIG. 1, $CaBr_2$ alone, PAC injection rate 0, resulted in less than about 50% mercury removal based on the mercury content of the coal consumed. The addition of PAC at 100 lbs/hr (PAC 30, PAC 16, PAC 6) resulted in similar reduction in mercury emission, about 50%, which varied slightly depending on the MPD of the PAC. The combination of $CaBr_2$ injection into the combustion chamber and PAC injection in the exhaust stream (Std+1×$CaBr_2$) showed improved reduction in mercury emission, as did the injection of brominated PAC (Std Br) into the exhaust stream. Notably, the combination of $CaBr_2$ injection into the combustion chamber and injection of a PAC having a smaller MPD into the exhaust stream (PAC 6+4×$CaBr_2$) resulted in nearly 90% reduction in mercury emissions, which represents almost 20% greater reduction in mercury emissions over brominated PAC (Std Br) and larger MPD PAC and $CaBr_2$ (Std.+1× $CaBr_2$). Similarly, when the injection rate for PAC was increased to 200 lbs/hr, small MPD PAC outperformed brominated PAC (Std. Br) and larger MPD PAC and various injection rates of $CaBr_2$ (Std. 1×$CaBr_2$; Std. 2×$CaBr_2$; Std. 3×$CaBr_2$; Std. 4×$CaBr_2$; and Std. 8×$CaBr_2$).

Example 2

Further testing was carried out to determine the injection rate for a given aqueous solution of $CaBr_2$ and PAC when the PAC is injected into the exhaust stream upstream of the APH (Post APH Injection) and downstream of the APH (Pre APH Injection) required to obtain 90% removal of mercury from plant emissions. The results are provided in Tables 3 and 4, respectively.

TABLE 3

Consumption at 90% mercury removal
POST APH INJECTION

| Indentifier | $CaBr_2$ (gal/hr) | PAC (lbs/hr) | #/MMacf |
|---|---|---|---|
| Std. | 20 | 300 | 2.5 |
| PAC 6 | 20 | 150 | 1.2 |
| Std. Br |   | 420 | 3.4 |

TABLE 4

Consumption at 90% mercury removal
PRE APH INJECTION

| Indentifier | $CaBr_2$ (gal/hr) | PAC (lbs/hr) | #/MMacf |
|---|---|---|---|
| Std. | 18 | 125 | 1.0 |
| PAC 6 | 6 | 60 | 0.5 |
| Std. Br |   | 320 | 2.6 |

Tables 3 and 4 show that a rate of $CaBr_2$ injection of 20 gal/hr and a PAC injection rate of 150 lbs/hr is sufficient to remove 90% of the mercury from the coal tested when small MPD PAC (PAC 6) is injected down stream of the APH whereas twice as much large MPD PAC (Std.) is required to achieve a similar result. When the PAC is injected upstream of the APH, 6 gal/hr of $CaBr_2$ and 60 lbs per hour of small MPD PAC (PAC 6) is necessary to remove 90% of the flue gas mercury at the same plant whereas 18 gla/hr of $CaBr_2$ and 125 lbs/hr of standard MPD PAC (Std.) are required to achieve the same result. These data demonstrate that a decrease in carbon particle size, especially below about 12 μm or about 10 μm, creates its own synergistic effect in that, surprisingly, both less carbon and less halogen are needed for the same level of mercury removal, especially at levels around or above 90% mercury removal. The combined savings in both halogen and sorbent result in greatly improved economics as well as fewer balance-of-plant impacts such as reduced carbon in the fly ash, allowing more of the ash to retain commercial value as a concrete additive.

The invention claimed is:

1. A method for reducing heavy metal emissions comprising:
   burning a heavy metal containing fuel in a combustion chamber;
   introducing molecular halogen or one or more halogen precursors into an exhaust stream produced as a result of the burning of the heavy metal containing fuel having a temperature greater than about 1000° F.; and
   introducing a sorbent into the exhaust stream upstream of an air pre-heater (APH);
   wherein the halogen and sorbent material are introduced at a ratio of from about 0.7 to about 5.7 moles of halogen per pound (lb) of sorbent material.

2. The method of claim 1, wherein the sorbent material is activated carbon.

3. The method of claim 1, wherein the sorbent material has a mean particle diameter (MPD) of less than about 15 μm.

4. The method of claim 1, wherein the one or more halogen precursors are selected from the group consisting of calcium hypochlorite, calcium hypobromite, calcium hypoiodite, calcium chloride, calcium bromide, calcium iodide, magnesium chloride, magnesium bromide, magnesium iodide, sodium chloride, sodium bromide, sodium iodide, ammonium chloride, ammonium bromide, ammonium iodide, potassium tri-chloride, potassium tri-bromide, and potassium tri-iodide.

5. The method of claim 1, wherein the halogen precursor is selected from the group consisting of calcium bromide (CaBr$_2$), ammonium bromide (NH$_4$Br), and combinations thereof.

6. The method of claim 1, wherein the halogen precursor are in an aqueous solution.

7. The method of claim 1, wherein the halogen precursor is a solid.

8. The method of claim 1, wherein the halogen or halogen precursor is a gas.

9. The method of claim 1, wherein the sorbent material is injected into the exhaust stream at a rate selected from the group consisting of less than about 5 pounds per million actual cubic (lbs/MMacf), less than about 4 lbs/MMacf, less than about 3, lbs/MMacf, and less than about 1 lbs/MMacf.

10. The method of claim 1, wherein about 90% of the mercury in the fuel source is removed.

11. The method of claim 1, wherein the fuel source is coal.

12. The method of claim 1, wherein a halogen is applied to the sorbent material.

13. The method of claim 12, wherein sorbent material has a mean particle diameter (MPD) of about 6 μm and the halogen is applied to the sorbent material to produce a final concentration of about 2.0 moles of halogen per pound of sorbent material.

14. The method of claim 12, wherein the halogen is applied to the sorbent material by wet impregnation.

15. The method of claim 12, wherein the halogen is applied to the sorbent material by combining dry activated carbon with dry halogen salt.

16. The method of claim 15, wherein the halogen salt is selected from the group consisting of calcium bromide (CaBr$_2$), ammonium bromide (NH$_4$Br) and combinations thereof.

* * * * *